No. 875,222. PATENTED DEC. 31, 1907.
S. S. SÖRENSEN & G. C. WESTBY.
PROCESS FOR TREATING SMELTER SMOKE AND EXTRACTING VALUES FROM ORES OR METALLURGICAL WASTE PRODUCTS.
APPLICATION FILED JAN. 25, 1906.
3 SHEETS—SHEET 1.
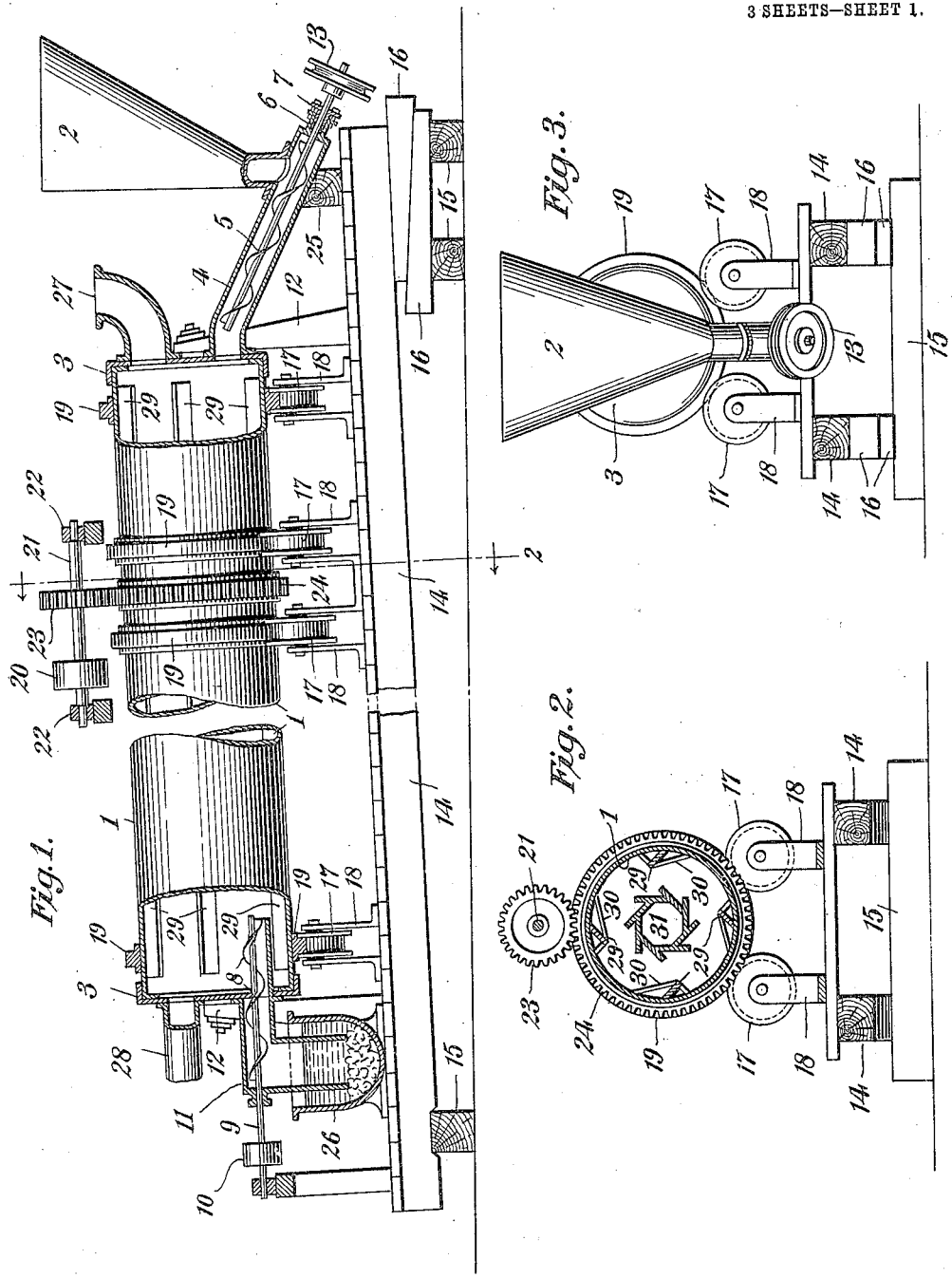
WITNESSES:
C. E. Ashley
Charles Engel
INVENTORS
Stanley Severin Sörensen
and George Cutler Westby
By their Attorney,
Millard Parker Butler

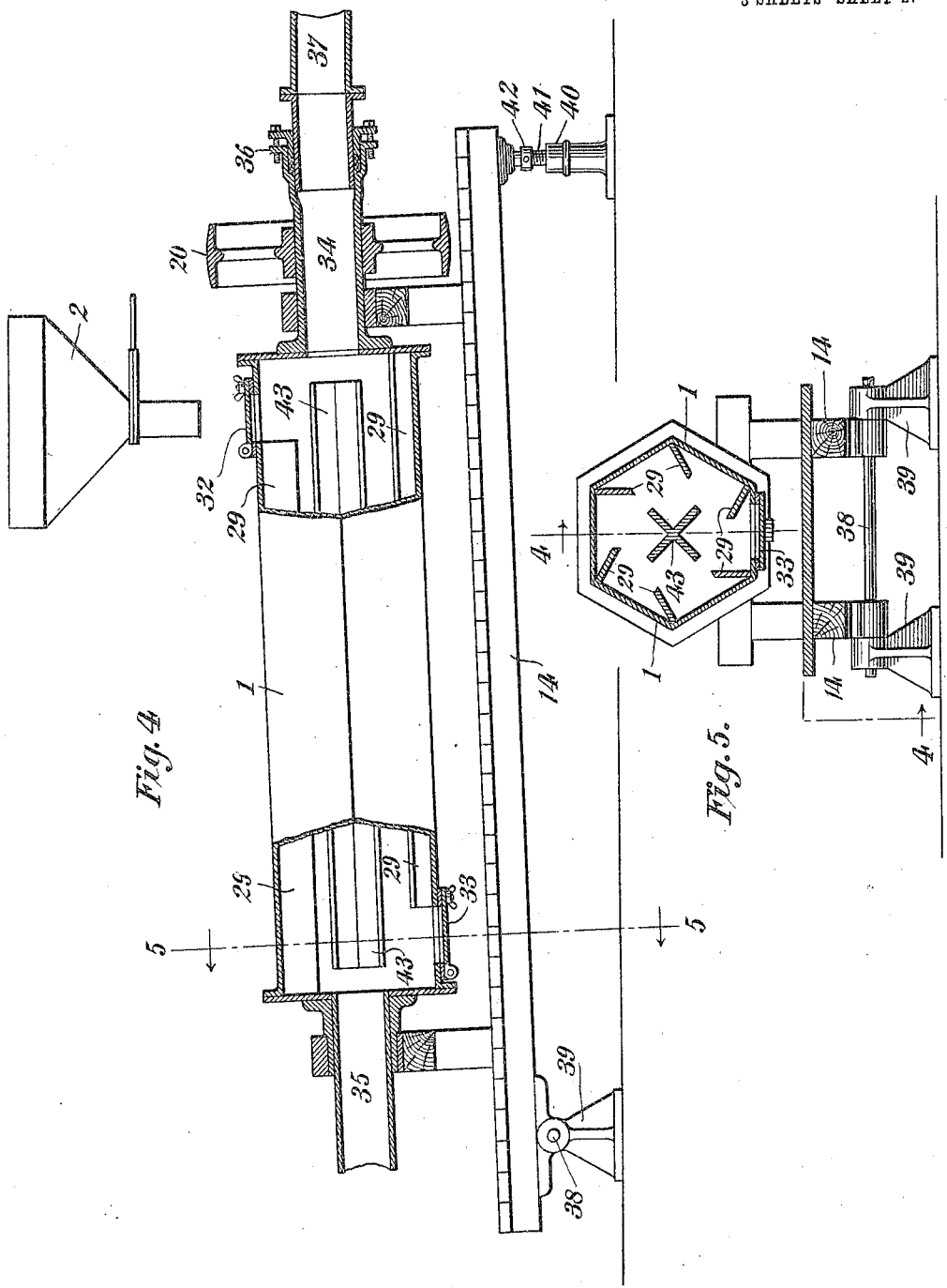

No. 875,222. PATENTED DEC. 31. 1907.
S. S. SÖRENSEN & G. C. WESTBY.
PROCESS FOR TREATING SMELTER SMOKE AND EXTRACTING VALUES FROM ORES OR METALLURGICAL WASTE PRODUCTS.
APPLICATION FILED JAN. 25, 1906.
3 SHEETS—SHEET 3.
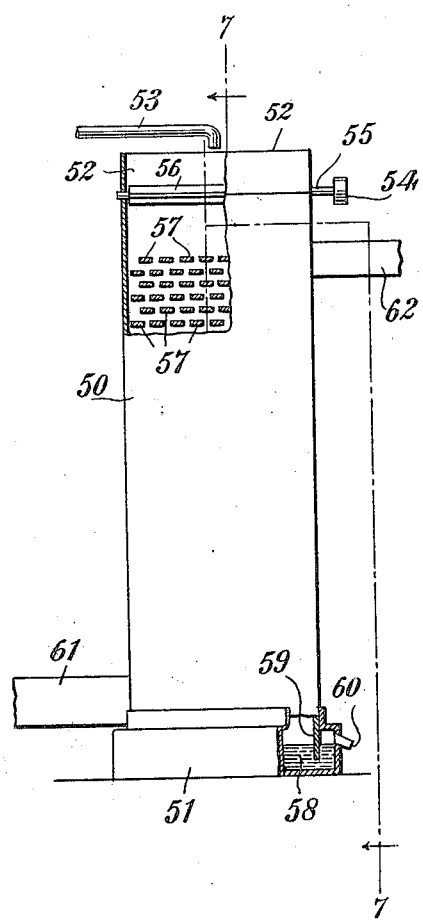
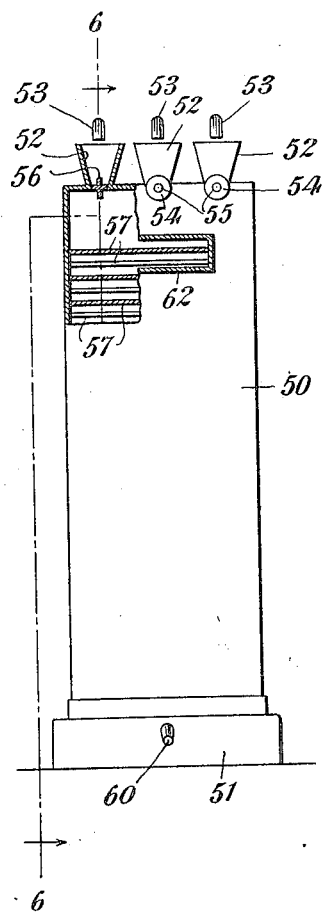
WITNESSES:
C. E. Ashley
Charles Engel
INVENTORS
Stanley Severin Sörensen
and George Cuthbert Westby
By their Attorney,
Millard Parker Butler

UNITED STATES PATENT OFFICE.

STANLEY SEVERIN SÖRENSEN AND GEORGE C. WESTBY, OF MURRAY, UTAH.

PROCESS FOR TREATING SMELTER SMOKE AND EXTRACTING VALUES FROM ORES OR METALLURGICAL WASTE PRODUCTS.

No. 875,222.     Specification of Letters Patent.     Patented Dec. 31, 1907.

Application filed January 25, 1906. Serial No. 297,920.

*To all whom it may concern:*

Be it known that we, STANLEY SEVERIN SÖRENSEN and GEORGE CUTLER WESTBY, the former a British subject and the latter a citizen of the United States of America, and residents of Murray, county of Salt Lake, and State of Utah, have invented certain new and useful Improvements in Processes for Treating Smelter Smoke and Extracting Values from Ores or Metallurgical Waste Products, of which the following is a specification.

Our invention relates to improvements in method of and apparatus for the purification of smelter smoke containing injurious or obnoxious gases or vapors of sulfur arsenic and the like and rendering it harmless to animal and vegetable life; and the recovery of the commercially valuable constituents of ore treatment wastes or of ore.

Heretofore it has been the practice to render harmless the smelter smoke arising from various metallurgical operations in the treatment of sulfid ores, such as roasting, smelting, converting or refining, by cooling and scrubbing the smoke with water in various forms of absorption towers or flues, or by means of milk of lime or by magnesium hydrate or carbonate or oxid in apparatus specially designed therefor. Now we have discovered that smelter smoke of the kind described can be more advantageously and economically purified by bringing the said smoke after it issues from the furnaces or other apparatus in which it is generated, directly into contact with suitable and suitably prepared metallurgical wastes such as slag or tailings or ores under the proper conditions to be hereinafter described, whereby not only is the said smoke purified but the otherwise lost constituents in the said metallurgical wastes or ores are largely recovered.

Our process consists of causing the hot smoke to come into direct and intimate contact with finely divided moistened waste-products such as granulated slag, slag wool, tailings, or ore, or any combination of said materials whereby the sulfur gases in the smoke combine with the bases and metals in the said products. This combination is effected in the presence of and through the medium of water and water vapor whereby sulfates, sulfites, thiosulfates and possibly other thionous and thionic salts are formed, which are soluble in the presence of the free sulfurous and sulfuric acids simultaneously formed by the smoke. After the formation of the above salts other series of reactions occur whose cause depends on the apparatus used and other working conditions which are variable as for instance the temperature of the smoke, the concentration or percentage of sulfur dioxid, oxygen and water used in this part of the process. These reactions are not of primary importance, but it is preferable to secure a mixture in solution of sulfates, thionous and thionic salts.

The second step of the process consists in the recovery by precipitation from the solution formed as above described of copper and other metals precipitable as sulfids in a mineral acid solution. If the solution from the contact smoke scrubbing apparatus contains gelatinous silica in solution, in order to prevent the precipitation of the latter if the solution be not sufficiently acid, we add acid, preferably sulfuric acid, to keep the silica in solution and then heat or boil it. The copper and other precipitable metals are thereupon thrown down as sulfids by the action of the reducing salts already present in the liquor. The metals can then be recovered by any of the known processes.

When it is desired to precipitate the last traces of the aforesaid sulfureted metals, a solution of FeS, $FeS_2O_3$, and $FeSO_3$ is added which is obtained by treating metallic iron such as scrap by a solution of sulfurous acid or crude scrubbing liquors containing free $SO_2$. The metals are in this case also recovered from the sulfureted precipitates by any known method.

If desired, the supernatant liquor from the iron compounds may be treated for the purposes of saving the zinc, nickel, cobalt, etc. contained therein, by any of the well-known methods of treatment, or the liquor may be allowed to run to waste, as may be most convenient.

Where commercial conditions make it desirable, a liquor containing sulfuric acid is used as a substitute for the acid necessary to retain gelatinous silica in solution, which liquor is prepared by adding a solution of ferric sulfate or an oxidized scrubbing liquor to pyrites then adding to the mixture a little sulfurous acid or smoke scrubbing liquor and heating the whole to promote the reaction which forms $H_2SO_4$ according to the equation $$FeS_2 + 7Fe_2(SO_4)_3 + 8H_2O = 15FeSO_4 + 8H_2SO_4.$$

The sulfurous acid solution is added by reason of its availability and the necessity of an acidulated solution when heating a solution of ferric sulfate, care being taken not to add a sufficient amount of the reducing agent to interfere with the above reaction. The sulfurous acid, however, may be omitted and the sulfuric acid developed by treating the pyrites with cold solutions of ferric sulfate. At this stage local conditions may render it most profitable to discharge and waste the then residual liquor say for instance into the sea. But it may in other cases be profitable to extract further values or it may be necessary to render it more harmless before allowing it to run to waste. In the latter case the liquor is neutralized, say by calcareous earth or limestone and oxidized and is boiled with the occasional addition of calcareous earth or limestone as may be required to neutralize any fresh acidity developed during the formation of basic salts. Air is sometimes used in this connection to facilitate and hasten the oxidation. By these means a basic salt of iron is precipitated which is insoluble in water and which may according to local conditions be itself a marketable product.

When it is desired to obtain the silica separately from the solution from the smoke scrubbing apparatus the residual liquor is neutralized, after the copper and the other similarly precipitable metals have been precipitated therefrom, without oxidizing it and just gently heating by which the bulk of the silica is thrown down and obtained as a precipitate and the liquor is decanted and further treated for iron salts as above described. After the silica has settled out the supernatant liquor is withdrawn and completely oxidized by any commercial method, the liquor is then neutralized by the addition of lime, limestone or calcareous earth and boiled adding a little of these substances until the mixed basic sulfate and hydrate of iron are separated out. The precipitate is then allowed to settle out and the supernatant liquor from the precipitated iron compounds and the zinc, nickel, cobalt, and other metal therein, removed by treatment in any convenient manner.

It will thus be seen that by this invention the sulfur is transformed from the noxious state in which it exists in smelter smoke, to the innocuous and sometimes profitable state of a basic iron sulfate, and that the copper and other valuable metals and the silica can be recovered when so desired separately. Moreover the flue dust from the smoke together with its poisonous and acid qualities is removed by causing the flue dust laden smoke to come into contact with a great surface of wet and porous slag or ore; while at the same time certain of its valuable constituents are extracted, principally silver and copper by means of the smoke and the solvent liquor developed in the apparatus employed.

For the purpose of carrying out the above described process, a variety of apparatus may be employed, but we prefer, however, to make use of a chamber which may be vertical, horizontal or inclined, into which the dust-laden smoke is led directly by means of hoppers. The material may be fed from the flues into the apparatus by gravity in the case of a vertical chamber, or in other cases fed into the chamber from the hopper by means of a worm conveyer driven from a suitable source of power. The finely divided matter is caused to be mixed with water or solution produced at a previous operation. Where a vertical chamber is used the material is introduced at the top of the chamber either with the water or intermittently through the hoppers. When a horizontal or inclined chamber is employed, the slag or ore and water gravitate to the lower end of the chamber and may be discharged intermittently or continuously. The chamber is provided when stationary with a series of shelves in its interior carrying the finely powdered slag, ore or other suitable material moistened by water or solution and as the same is fed continuously or intermittently with the water through the hoppers, the water being regulated independently the material falls from shelf to shelf, these being staggered to produce an arrested fall without blocking the passage of the smoke around the shelves and through the apparatus. When the rotative form of apparatus is used, shelves or projections are provided in the interior, set at different angles to the circumference in order to lift and then spill the solid material and water at different points through the revolution in order to cause the mixing of gas with the material used. In both forms of apparatus the slag or other suitable material is thus gradually carried from top to bottom either of the tower or of the chamber by the washing action of the water and by gravity, and the solvent action of the smoke in combination with the water and the supply of the fresh solid reagent continually replaces the old or exhausted material. Sometimes apparatus consisting of a combination of the two forms above described, may be employed, the smoke passing first through one and then through the other, thereby securing the advantages of both forms, but in any case it is essential to employ an apparatus which will cause the smoke to make intimate and direct contact with the wetted particles of the finely divided material, by agitation or movement, so that fresh surfaces of wetted material will constantly be brought into contact with the smoke in the manner effected by the apparatus above described.

Apparatus of the character of that referred to above, is shown in the three sheets of drawings, which are in part of a diagrammatic nature, and which form part of this specification, and in which Figure 1 is a vertical elevation partly in cross section of the apparatus, in which a part of the process is carried out. Fig. 2 is a vertical cross section of the form of apparatus shown in Fig. 1 on the line 3—3 of Fig. 1. Fig. 3 is an end elevation of the form of apparatus shown in Fig. 1. Fig. 4 is a similar vertical section of the same part of the apparatus, with modifications in method of feed and discharge. Fig. 5 is a vertical cross section of the apparatus shown in Fig. 4 on the line 5—5 of said figure. Fig. 6 is a vertical elevation partly in section of another form of the apparatus used for carrying out said process on the line 6—6 of Fig. 7; and Fig. 7 is an elevation partly in section of the same part of the apparatus on the line 7—7 of Fig. 6.

Similar numerals refer to similar parts throughout the several views.

In the drawings Fig. 1 represents a chamber which is horizontal or inclined. The cylinder ends are supported at either end upon the brackets 12, which in turn are mounted upon a table 14, resting upon the blocks 15. One end of this table is capable of being lowered by means of the manipulation of the block 16, which is placed between it and the block 15 at the right hand end of Fig. 1. By driving in the upper block 16 or driving it out, the angle of inclination of the table 14 may be varied. For the purposes of supporting the cylinder 1, the rollers 17 mounted upon suitable supports 18 are provided, which engage with circular bands 19 upon the exterior surface of the cylinder 1.

Rotary motion is imparted to the cylinder by the driving pulley 20 mounted on the shaft 21 supported on the blocks 22, or in any other convenient manner. The shaft 21 carries a gear wheel 23, which engages with a gear 24 on the exterior surface of the cylinder 1. The ends of the cylinder are open, as shown in Fig. 1, rotate freely in the heads 3 at either end.

2 is a feed hopper supported on a block 25 at the end of the table which opens into a preferably circular feed pipe 4, which enters the head 3 at the point shown and emerges into the interior of the cylinder 1.

The feed pipe 4 is provided in its interior with a worm conveyer 5 driven by a pulley 13 attached to the shaft 6 of the worm conveyer, which passes out through suitable stuffing box 7; the discharge is effected by means of a similar worm conveyer 8 at the other end of the cylinder 1 which conveyer is mounted upon the shaft 9 and driven by the pulley 10 and placed within a bent cylinder 11, which emerges in one end into the rear end of the cylinder and at the other end into a suitable receptacle 26, which is sealed with water or other solution in which the material treated is collected.

A flue 27 enters the cylinder at opposite end 2 the feed end through which the smoke is admitted to the interior, and a suitable flue 28 emerges therefrom at the feed end through which the smoke after treatment can escape.

The interior of the chamber is provided throughout its length with a series of shelves 29 supported on the brackets 30, and in the center is a continuous series of shelves 31 supported by suitable webs which are not shown, so that the central series of shelves rotate with the chamber. These shelves are set at different angles to the circumference and their object is to spill the material being treated in thin streams through the different arcs of rotation so as to produce thorough mixing and the necessary direct and intimate contact of a large aggregate surface of the wetted material and the smoke.

In the structure shown in Fig. 4, the material is admitted from the hopper 2 through a manhole 32 in the top of the cylinder and is discharged through a manhole 33 at the other end. The cylinder is supported as heretofore, the only difference being that the bearings at either end are sufficiently large to enable the smoke to flow in through the hollow center of the bearing 34 and to be discharged through the hollow center of the bearing 35. The rotary movement is imparted in this case by means of pulley 20, which instead of being placed on a separate driving shaft, is placed on the main shaft of the machine. A stuffing box 36 connects the hollow shaft 34 with the pipe 37 in such a way as to effect angular connection and adjustment when the table is raised and lowered.

The shelves 29 in the interior of the chamber are of the same general construction as those shown in Figs. 1 and 2, but the central shelf 31 is replaced by the shelves 43. The shelves 29 and 31 and 43 may be of any convenient form, and may be set at whatever angles may be found to give the best results.

Figs. 6 and 7 show a vertical tower or flue 50, in which is arranged a number of shelves 57. 52 is a series of hoppers at the base of each of which is a rotary feeder 56 carried on a shaft 55 driven from pulley 54. 53 is a pipe through which water or other solution may enter intermittently and flow from shelf to shelf through the tower, the shelves 57 being arranged staggered to produce an arrested fall without blocking the passage of the smoke through the shelves and through the tower. The water which settles at the bottom of the tower at 58 is discharged by the spout 60, a seal being effected by the blade 59. 61 is a flue through which the smoke enters and 62 is a flue through which it passes out.

For precipitating the various products we do so in any suitable form of tanks or vats using preferably wooden construction with lead steam pipes for heating and boiling the various liquids as required.

We claim as our invention:

1. The hereinbefore described process of purifying smelter smoke and extracting values from ores or metallurgical waste products consisting in preparing the materials to be treated by comminuting the same, and then causing sulfurous smoke to come in contact with the materials in the presence of moisture or water while they are being agitated, whereby the valuable bases or metals of the slag, are converted into sulfates, thionites, and sulfites by means of the sulfur thionates, dioxids and sulfuric acid of the smoke.

2. The herein described process for purifying smelter smoke and extracting values from ores or metallurgical waste products consisting in preparing the materials to be treated by comminuting the same and then causing the sulfurous smoke to come into direct contact with the materials in the presence of moisture or water while they are being agitated, whereby the sulfur dioxid and sulfuric acid of the smoke with the aid of solutions present in the mass resultant from the reactions between the materials being treated and the smoke combine with the bases, metals and salts of the materials being treated, and pass into solution, substantially as set forth.

3. The hereinbefore described process of purifying smelter smoke and extracting values from ores or metallurgical waste products, consisting in causing such ores or products or any mixture thereof, suitably prepared by grinding, shredding, granulating or otherwise finely comminuting, to come in a moistened or wet state, into direct and intimate contact with the smoke, by substantially continuous minutely subdividing agitation or movement of said ores or products by means of spilling in fine streams or drops in suitable receptacles whereby fresh surfaces of such ores or products are exposed at frequent intervals, and the sulfur dioxid and sulfuric acid of the smoke are caused to combine with the valuable bases or metals of the material to be treated and become converted into sulfates, thionates, thionites and sulfites and the flue dust is extracted, and subsequently treating the residual liquor and undissolved residues for the recovery of the values therein, in any desired manner.

4. The hereinbefore described process of purifying smelter smoke and extracting values from ores or metallurgical waste products, consisting in causing such ores or products or any mixture thereof, suitably prepared by grinding, shredding, granulating or otherwise finely comminuting, to come in a moistened or wet state, into direct and intimate contact with the smoke, by substantially continuous minutely subdividing agitation or movement of said ores or products by means of spilling in fine streams or drops in suitable receptacles whereby fresh surfaces of such ores or products are exposed at frequent intervals, and the sulfur dioxid and sulfur acid of the smoke with the aid of solutions present in the mass resultant from the reactions between the material being treated and the smoke, combine with the metals, bases and salts of the materials being treated and go into solution, and subsequently treating the residual liquor and indissoluble residues for the recovery of the values therein, in any desired manner.

5. The herein described process of purifying smelter smoke and extracting values from slag, slimes, tailings or ores, consisting in preparing the materials to be treated by comminuting the same, in causing the sulfurous smoke to come into direct contact with the materials in the presence of moisture or water, while they are being agitated, whereby the valuable bases or metals of the materials are converted into sulfates, thionates, thionites and sulfites by means of the sulfur dioxid and sulfuric acid of the smoke, and collecting the valuable residual concentrates left after the solution of the bulk of the material.

6. The hereinbefore described process of purifying smelter smoke slag and extracting values from slag, slimes, tailings or ores, consisting in preparing the materials to be treated by comminuting the same, then causing sulfurous smoke to come in contact with the materials in the presence of moisture or water when they are being agitated whereby the valuable bases or metals of the material are converted into sulfates, thionates, thionites, and sulfites by means of the sulfur dioxids and sulfuric acid of the smoke, collecting the valuable residual concentrates, evaporating the solution, and finally collecting the residual products.

7. The hereinbefore described process for purifying smelter smoke and extracting the valuable material from finely divided slag, slimes, tailings or ores, consisting in causing the sulfurous smoke to come into direct contact with the suitably prepared materials to be treated in the presence of moisture or water, then collecting the liquor which has drained from the purifying apparatus, and finally allowing the precipitates formed to settle together with any silica precipitated, substantially as set forth.

8. The hereinbefore described process for purifying smelter smoke and extracting the valuable material from finely divided slag, slimes, tailings or ores, consisting in causing the sulfurous smoke to come into direct contact with the suitably prepared materials to be treated in the presence of moisture or water, then removing the liquor from the purifying apparatus, heating the same, and finally allowing the precipitates formed to settle, substantially as set forth.

9. The hereinbefore described process for purifying smelter smoke and extracting values from finely divided slag, slimes, tailings or ores, consisting in causing the sulfurous smoke to come in direct contact with the suitably prepared materials to be treated in the presence of moisture or water, collecting the liquor which is drained from the purifying apparatus, acidifying it and heating it and precipitating the copper therefrom, and subsequently treating the residual liquor for the recovery of the values therein in any desired manner.

10. The hereinbefore described process for purifying smelter smoke and extracting values from finely divided slag, slimes, tailings or ores consisting in causing the sulfurous smoke to come into direct contact with suitably prepared materials to be treated in the presence of moisture or water, and collecting the liquor which has drained from the purifying apparatus, heating it, and allowing the precipitates formed to settle, substantially as set forth.

11. The hereinbefore described process for purifying smelter smoke and extracting values from finely divided slag, slimes, tailings or ores consisting in causing the sulfurous smoke to come into direct contact with suitably prepared materials to be treated in the presence of moisture or water and collecting the liquor which has drained from the purifying apparatus, acidifying and heating it and allowing the precipitates formed to settle, substantially as set forth.

12. The hereinbefore described process for purifying smelter smoke and extracting values from finely divided slag, slimes, tailings or ores, consisting in causing the sulfurous smoke to come into direct contact with suitably prepared materials to be treated in the presence of moisture or water, collecting the liquor which has drained from the purifying apparatus, adding thereto a suitably prepared solution containing sulfuric acid, heating the mixed solutions and allowing the precipitates to settle out, substantially as set forth.

13. The hereinbefore described process for purifying smelter smoke and extracting values from finely divided slag, slimes, tailings or ores, consisting in causing the sulfurous smoke to come into direct contact with suitably prepared materials to be treated in the presence of moisture or water, collecting the liquor drained from the purifying apparatus, adding an acid or acid liquor, adding a solution prepared by treating metallic iron with sulfurous acid, or smoke scrubbing liquor containing sulfurous acid, and heating the mixed solutions and allowing the precipitates formed to settle, substantially as set forth.

14. The hereinbefore described process for purifying smelter smoke and extracting values from the finely divided slag, slimes, tailings or ores, consisting in causing the sulphurous smoke to come into direct contact with suitably prepared materials to be treated in the presence of moisture or water, collecting the liquor drained from the purifying apparatus, adding an acid or acid liquor and a solution containing sulfur salts of iron prepared by the addition of a liquor containing sulfurous acid to metallic iron, heating and allowing the metallic precipitates formed to settle out, filtering or decanting the supernatant liquor, then neutralizing or nearly neutralizing the filtrate, and heating the liquor allowing the precipitated silica to settle out, substantially as set forth.

15. The hereinbefore described process for purifying smelter smoke and extracting values from finely divided slag, slimes, tailings or ores, consisting in causing the sulfurous smoke to come into direct contact with suitably prepared materials to be treated in the presence of moisture or water, collecting the liquor drained from the purifying apparatus, adding thereto a solution prepared by treating metallic iron with a solution containing sulfurous acid, and heating the mixed solution and allowing the metallic precipitates and silica to settle out, substantially as set forth.

16. The hereinbefore described process for purifying smelter smoke and extracting values from finely divided slag, slimes, tailings or ores, consisting in causing the sulfurous smoke to come into direct contact with suitably prepared materials to be treated in the presence of moisture or water, then collecting the liquor drained from the purifying apparatus, then adding an acid or acid liquor and a solution containing sulfur salts of iron prepared by the addition of a liquor containing sulfurous acid to iron, heating and allowing the metallic precipitates formed to settle out, filtering or decanting the supernatant liquor, neutralizing or nearly neutralizing the filtrate, heating the filtrate and allowing the precipitated silica to settle out, withdrawing the supernatant liquor from the silica and oxidizing the liquor by any known commercial means completely, neutralizing the liquor with lime, limestone or calcareous earth, boiling the liquor adding a little lime, limestone or calcareous earth from time to time until the mixed basic sulfate and hydrate of iron separates out, allowing the precipitate to settle out, withdrawing the supernatant liquor from the precipitated iron compounds, and thereafter treating the acid liquor if desired for zinc, nickel, cobalt, and other metals by any known method, substantially as set forth.

In testimony, that we claim the foregoing as our invention, and have signed our names in presence of two witnesses, this seventeenth day of January, 1906.

S. SEVERIN SÖRENSEN.
GEORGE C. WESTBY.

Witnesses:
A. A. BIRD,
DAVID W. MOFFAT.